(12) United States Patent
Simpson

(10) Patent No.: US 6,962,617 B2
(45) Date of Patent: Nov. 8, 2005

(54) METHOD OF REMOVING MERCURY FROM EXHAUST GASES

(75) Inventor: Dale R. Simpson, Bath, PA (US)

(73) Assignee: Lehigh University, Bethlehem, PA (US)

( * ) Notice: Subject to any disclaimer, the term of this patent is extended or adjusted under 35 U.S.C. 154(b) by 111 days.

(21) Appl. No.: 10/611,890

(22) Filed: Jul. 3, 2003

(65) Prior Publication Data

US 2005/0000357 A1 Jan. 6, 2005

(51) Int. Cl.$^7$ .......................... B01D 53/04; B01D 53/64
(52) U.S. Cl. ........................ 95/134; 95/902; 423/210
(58) Field of Search .................. 95/134, 902; 423/210; 502/60, 78, 85

(56) References Cited

U.S. PATENT DOCUMENTS

| | | | | |
|---|---|---|---|---|
| 4,101,631 A | | 7/1978 | Ambrosini et al. ......... 423/210 |
| 4,582,936 A | * | 4/1986 | Ashina et al. ............. 564/479 |
| 4,716,137 A | * | 12/1987 | Lewis ...................... 502/74 |
| 4,892,567 A | | 1/1990 | Yan ........................ 55/33 |
| 4,933,158 A | * | 6/1990 | Aritsuka et al. .......... 423/210 |
| 4,964,889 A | * | 10/1990 | Chao ........................ 95/96 |
| 5,116,793 A | * | 5/1992 | Chao et al. .............. 502/68 |
| 5,137,854 A | * | 8/1992 | Segawa et al. ............ 502/64 |
| 5,162,598 A | * | 11/1992 | Hutchings et al. ......... 585/651 |
| 5,350,728 A | * | 9/1994 | Cameron et al. .......... 502/415 |
| 5,460,643 A | | 10/1995 | Hasenpusch et al. ........ 95/134 |
| 5,587,003 A | * | 12/1996 | Bulow et al. ............. 95/123 |
| 5,659,100 A | | 8/1997 | Lin ....................... 585/503 |
| 5,810,910 A | * | 9/1998 | Ludwig et al. ............ 95/138 |
| 5,910,292 A | * | 6/1999 | Alvarez et al. ........... 423/210 |
| 5,989,506 A | * | 11/1999 | Markovs ................... 423/210 |
| 6,719,828 B1 | * | 4/2004 | Lovell et al. ............. 95/134 |

FOREIGN PATENT DOCUMENTS

DE     28 41 565 A1     4/1980

* cited by examiner

*Primary Examiner*—Robert H. Spitzer
(74) *Attorney, Agent, or Firm*—Fitzpatrick, Cella, Harper & Scinto

(57) ABSTRACT

Efficient removal of mercury from the exhaust gases of an industrial process or combustion process can be achieved using an adsorbent that can be regenerated by a simple and efficient method. The mercury is contacted with a sorbent material, the sorbent material being hydrogen mordenite or hydrogen clinoptilolite, for adsorbing mercury and causing the mercury to react with the sorbent material to produce mercury-laden sorbent material. The mercury-laden sorbent material can be heated to a temperature of at least about 400° C. so as to remove mercury from the mercury-laden sorbent material and to regenerate the sorbent material to allow reusing of the sorbent material for mercury removal.

19 Claims, 1 Drawing Sheet

METHOD OF REMOVING MERCURY FROM EXHAUST GASES

BACKGROUND OF THE INVENTION

This invention relates to a method of removing mercury species, in particular, elemental mercury, from exhaust gases of industrial and combustion processes.

Exposure to high levels of mercury is associated with serious neurological and developmental effects in human beings. Concentrations of mercury in the air are usually low and of little concern, but once mercury enters water, it can accumulate in fish and cause harm to people who eat mercury-contaminated fish. Many industrial and combustion processes produce exhaust gases having low, but still significant, levels of mercury. For example, even if the levels of mercury in coals are low, mercury emissions from coal-fired power plants have recently been determined to pose a significant hazard to public health. Thus, the reduction of mercury in the exhaust gases of industrial and combustion processes is of great importance.

It is known that exhaust gases emanating from industrial and combustion processes may contain mercury in elemental, oxidized, and particulate forms. Elemental mercury in exhaust gases does not stick to soot and other particles entrained with the gases, but tends to remain in vapor form even after the exhaust gases are cooled to about 65° C. Therefore, at least a portion of elemental mercury in the exhaust gases is not recovered by conventional dust removal devices, such as electrostatic precipitators, fabric filters, or conventional scrubbers, but is instead released into the atmosphere.

Volatilized mercury from industrial and combustion processes may be recovered by adsorption on powdered activated carbon injected into the exhaust gases upstream of air pollution control devices. However, mercury adsorption on activated carbon is not very efficient. Activated carbon treated by sulfur compounds is more efficient but cannot be regenerated after it is saturated. Therefore, the use of activated carbon for mercury removal tends to produce large amounts of unregenerated adsorbents mixed with fly ash from the process, and thus, leads to problems involved in disposing large amounts of mercury-containing wastes.

Zeolites are widely used as adsorbents, catalyst carriers, and filters. These compounds are framework silicates that contain aluminum as a substitute for a portion of the silicon atoms. Such a substitution results in a charge imbalance which is compensated for by the addition of an alkali or alkaline ion, such as sodium. This alkali or alkaline ion may be exchanged with other ions to produce different species of zeolites. Zeolite frameworks are arranged so that the crystal structure has cavities and pores on an atomic scale. Each species of zeolite has a specific composition and structure. Therefore, each species contains uniform pores of a specific size. Zeolites have a range of physical and chemical properties because of differences in their composition and structure.

German Patent Publication No. DE 2,841,565 discloses a process for mercury adsorption, wherein zeolites, such as so-called Zeolites A, X and Y, are ion-exchanged with transition metals, such as silver, copper and zinc, prior to being contacted with a mercury-containing gas. U.S. Pat. No. 4,101,631 describes a process in which mercury vapor is selectively chemisorbed from gas streams by contact with zeolitic molecular sieves having elemental sulfur loaded thereon.

U.S. Pat. No. 4,892,567 describes a process in which mercury and water are simultaneously removed from fluids by contacting the fluids with zeolite A activated by silver or gold. U.S. Pat. No. 5,460,643 discloses a process where waste gas containing mercury is conveyed to an adsorption tower filled with ceramic particles, such as zeolite, impregnated with silver nitrate. The ceramic particles are regenerated for recycling by heating them to a temperature from about 600 to about 900° C. and converting the silver formed during the heating operation back to silver nitrate by contact with nitric acid.

U.S. Pat. No. 5,659,110 describes a process for purifying exhaust gases produced by combusting waste materials which includes reacting the gases with a mixture containing naturally occurring zeolites to remove mercury and mercury compounds from the exhaust gases. The mixture contains 10 to 20% by weight mordenite and 60 to 70% clinoptilolite.

All the methods discussed in the patents referred to above may suffer from insufficient mercury removal efficiency or incomplete regeneration. Thus, there is need for a new method that provides efficient mercury removal using an adsorbent that can be regenerated by a simple and an efficient method.

SUMMARY OF THE INVENTION

An object of the present invention is to provide a new and an efficient method of removing mercury from the exhaust gases of an industrial process or combustion process.

Another object of the invention is to provide a method of effectively adsorbing and reacting mercury on an adsorbent material that can be regenerated by a simple and an efficient method.

In order to achieve these and other objects, the invention provides a novel method of removing mercury from the exhaust gases of industrial or combustion processes. Thus, the invention provides a method comprising contacting the mercury in the exhaust gas with a sorbent material, wherein the sorbent material is hydrogen mordenite or hydrogen clinoptilolite, for adsorbing mercury and for causing the mercury to react with the sorbent material.

Mordenite is a mineral of the zeolite group, the name being applied also to synthesized products having similar compositions and structures. Ideally, the composition of mordenite is $Na_2O \cdot Al_2O_3 \cdot 10SiO_2 \cdot 6H_2O$. Mordenite is a zeolite with two intersecting sets of channels, or pores. One set of the channels has a cross section of about 5.7×7.0 Å, and the other set correspondingly about 2.6×5.7 Å. Sodium cations are on the surface of the channels.

One process for preparing hydrogen, or acid, mordenite includes exchanging the sodium ions with ammonium ions. With calcination, the ammonium ions decompose, liberating ammonia and leaving a residual hydrogen ion, or proton, in the former sodium site. Alternatively, hydrogen mordenite can be produced by leaching sodium mordenite in acid to exchange the sodium ion in the structure with a hydronium ion, $H_3O^+$. With a thermal soak, the hydronium ion liberates a water molecule, leaving a hydrogen ion, or proton, in the former sodium site.

I have found out that when mercury-containing gas is contacted with fine-grained hydrogen mordenite material, mercury is adsorbed on the material with very high efficiency. I have also found out that heating of the mercury-loaded hydrogen mordenite expels the mercury, which can then be recovered by condensing it from the exhaust vapor. By this thermal purging of mercury, the adsorbent material is efficiently regenerated for reuse without any further treatment.

The adsorption of mercury from a gas stream requires the capture of an atom or molecule by the surface of a solid sorbent. A porous material having a large surface area available for the adsorption is needed for efficient mercury removal. However, adhesion to the surface by weak attractive forces, such as van der Waals force, would permit the mercury to readily volatilize from the host. In the present case, mercury atoms adsorbed on hydrogen mordenite are subsequently oxidized on the surface and chemically adhered to the host by an ionic or covalent bond. Thus, removal of mercury from the host requires disruption of the chemical bond and takes place only when the mercury-loaded adsorbent is heated to a sufficient temperature.

The practical adsorption, reaction, and retention of mercury from a vapor requires the sorbent to have a large surface area with exchangeable ions or active sites. It is further desired that this large surface area is achieved with through-going pores, lined with exchangeable ions, with a sufficient size to accommodate the mercury or mercury compounds. An architecture of the through-going pores, such as nodes at repeated distances or intersections with other through-going pores, facilitates the retention of mercury in the pores.

Because many exhaust gases are acidic and therefore corrosive, the sorbent must have adequate chemical and thermal stability to withstand the environment of the mercury-bearing gas stream or vapor. It has been found that hydrogen mordenite has excellent stability in high temperature or acid environments. Recovery of mercury and regeneration of the sorbent will require the sorbent to have an even greater thermal stability than that required for the adsorption reaction process. As indicated above, hydrogen mordenite can withstand the temperature required for the efficient recovery of mercury therefrom.

Hydrogen mordenite produced by ammonium exchange adsorbs and reacts with mercury, but its adsorption capacity is lower than that of hydrogen mordenite produced by acid leaching. However, it has been noted that the adsorption capacity of hydrogen mordenite produced by ammonium exchange may be increased by subsequently leaching the hydrogen mordenite in acid, washing, and drying it. A possible explanation for this is that the acid leaching opens the small set (2.6×5.7 Å) of zeolitic cavities of mordenite, so that the cavities will accommodate mercury atoms or monovalent and divalent ions having a diameter of about 3.14, 2.54, and 2.20 Å, respectively. Thus, it seems that the cavities may be enlarged in acid leaching either by the ion exchange of alkali or alkaline ions with hydrogen ions, or by the removal of foreign or extraneous material, or a combination of the processes.

Hydrogen mordenite is especially suited for the adsorption-reaction of mercury because it has (1) a chemical and physical stability that permits the acid leach and thermal soak followed by later use in an exhaust or flue gas environment, (2) a pore size and arrangement, and side pockets that accommodate mercury, mercury oxide, and mercury chloride, and (3) ion exchange capacity.

Another zeolite, clinoptilolite, has pores of 4.4×7.2 Å. There is a chemical variance among different clinoptilolites, which results in different physical and chemical properties. As compared to mordenite, clinoptilolite is enriched in potassium, aluminum, and calcium, and depleted in silicon. Some clinoptilolites can be leached in acid to produce an adsorbent reactant for mercury, whereas other clinoptilolites have, after acid leaching, a significantly degraded crystal structure and fail to adsorb much mercury. Thus, by selecting a clinoptilolite stock that can be ion-exchanged and acid-leached without degradation of the crystal structure, a mercury adsorbent and reactant may be produced.

Most unleached samples of clinoptilolite seem to persist without degradation with a 400° C. thermal soak, but acid leaching has been found to decrease the thermal stability. Thus, mercury-loaded hydrogen clinoptilolite does not seem to be as suitable as hydrogen mordenite for regeneration by thermal soak. However, because of their low cost, selected samples of hydrogen clinoptilolite provide an advantageous sorbent at least for a single-cycle use. One skilled in the art may recognize also that other zeolites may have enhanced use for mercury reaction by converting to the hydrogen form, preferably by acid leaching, washing, and drying.

The surface of mordenite or clinoptilolite treated by acid leaching, or ammonium ion exchange followed by thermal and acid soaks, is an oxidation catalyst for $Hg^0$ to $Hg^{+2}$. The oxidized mercury is then chemically bonded to a site on the zeolite surface. The oxidation and chemical bonding are hypothesized to take place at the same site, i.e., at the hydrogen ion site.

Acid-leached mordenite, or selected samples of acid-leached clinoptilolites, become yellow to red-brown when exposed to mercury. When analyzing mercury-exposed mordenite samples, it was noticed that the X-ray diffraction peaks of mordenite with reacted mercury give the same "d" spacing as the stock hydrogen mordenite, but the intensity of the peaks is diminished. No new phases have been found by X-ray diffraction. The optical birefringence of the mercury-exposed mordenites is much greater than that of the original hydrogen mordenites. This shows that mercury is chemically bonded in the mordenite, not simply an adsorbed layer.

Mordenite and other zeolites can be ion-exchanged or impregnated with metals or ions, and such metal-bearing zeolite may be used as a catalyst. For example, copper-exchanged or impregnated mordenite or other zeolites may be used for catalyzing the reaction of ammonia with $NO_x$ in flue gas, and other reactions. By (1) acid leaching and drying mordenite, (2) immersing in a copper nitrate impregnation solution, and (3) calcining to 500° C., copper-impregnated hydrogen mordenite is obtained. I have found out that such a metal-impregnated mordenite functions also as an adsorbent, an oxidant, and a reactant for mercury.

It has previously been observed that sodium mordenite adsorbs $SO_2$. However, the adsorption capacity for $SO_2$ was directly related to the $Na_2O$ content of the mordenite. Because sodium has been leached out from the hydrogen mordenite, it is believed that the mercury adsorption of hydrogen mordenite is not hampered by competitive adsorption of $SO_2$. Additionally, the hydrogen mordenite sorbent could advantageously be supplied to the flue gas stream downstream from the $SO_2$ removal and $NO_x$ treatment site.

DETAILED DESCRIPTION OF THE PREFERRED EMBODIMENTS

Figure 1:
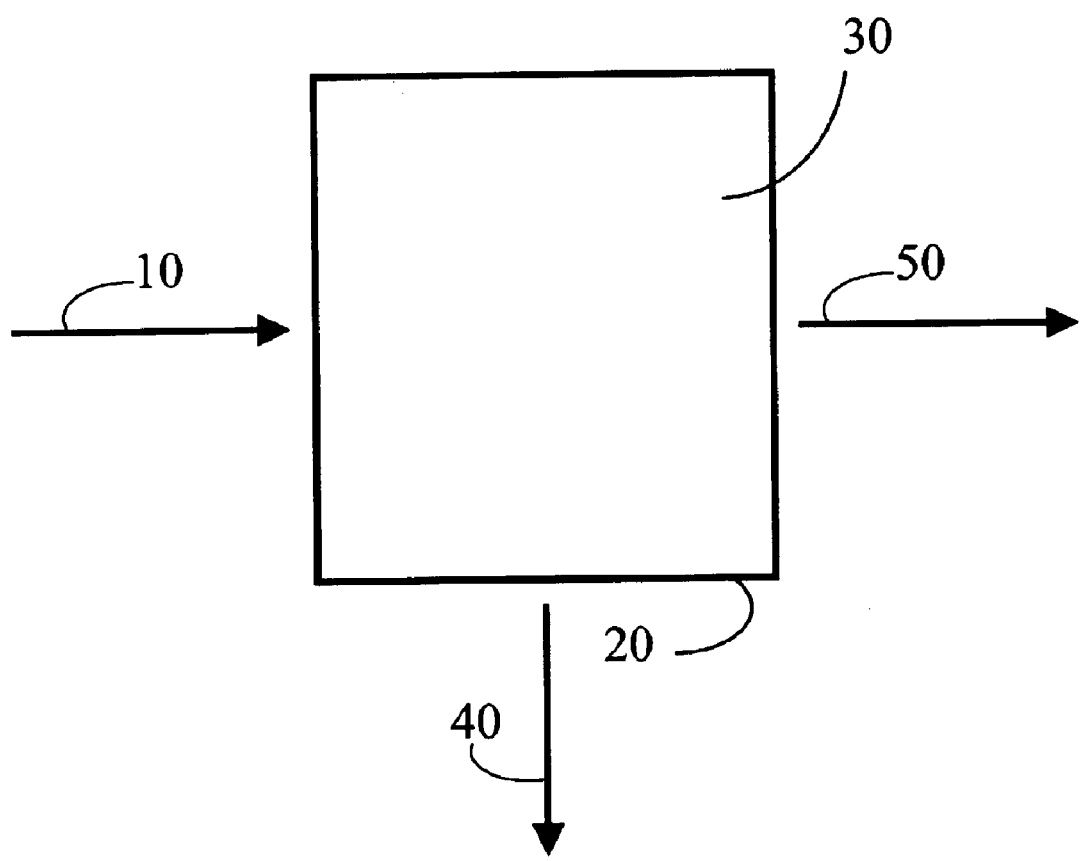
FIG. 1 is a schematic flow diagram of a method according to an embodiment of the invention.

According to the invention, mercury is removed from exhaust gases emanating from an industrial process or a combustion process by allowing the exhaust gases to adsorb and to react with a sorbent material comprising hydrogen mordenite or hydrogen clinoptilolite.

In FIG. 1, reference numeral 10 indicates mercury-containing exhaust gases emanating from an industrial process or a combustion process, and 20 is an adsorption tower or the like, filled with a sorbent material 30 comprising hydrogen mordenite or hydrogen clinoptilolite. In the tower 20, the mercury-containing exhaust gases 10 are contacted with the sorbent material 30, which adsorbs and reacts with mercury in the exhaust gases to produce mercury-laden sorbent material 40. Reference numeral 50 indicates cleaned exhaust gas.

Preferably, the exhaust gases are allowed to contact with the sorbent material at a location where the temperature of the exhaust gases is higher than room temperature, more preferably higher than about 100° C., and even more preferably higher than about 180° C.

According to a preferred embodiment of the invention, a particulate fixed bed including a layer of hydrogen mordenite is provided, and the removal of mercury from an exhaust gas is carried out by conducting the exhaust gas through the fixed bed. Advantageously, the sorbent is in pelletized form, in order to minimize pressure drop in the bed. Preferably, the sorbent material is regenerated by removing mercury-laden sorbent material from the bed and heating it to a temperature of at least about 400° C. so as to evaporate the mercury from the sorbent material. The regeneration can be carried out continuously for a small portion of the sorbent material or at selected time intervals. Because of the very high adsorption capacity of the sorbent material, the amount of sorbent material can advantageously be selected such that the time interval between regeneration processes is very long. Preferably, the bed is regenerated only during regular stoppages of the process.

According to another preferred embodiment of the invention, the pressure drop of the flue gas is minimized by using hydrogen mordenite as the effective constituent of a honeycomb element system. The system is preferably located downstream of an electrostatic precipitator (ESP) or a fabric filter in the exhaust gas train. The honeycomb system is advantageously constructed so that the adsorbent can be regenerated while mercury is collected. This can be done, for example, by a system having two parallel honeycomb element units, which can be separated one at a time from the process for regeneration. According to another preferred embodiment of the invention, the amount of sorbent material in the system is selected such that the sorbent is to be regenerated only during regular stoppages of the process.

This invention can be applied to removing mercury from the exhaust gases of many types of industrial and combustion processes. Such combustion processes may be carried out, for example, in circulating or bubbling fluidized bed reactors, in pulverized fuel combusting plants, or in waste incinerators.

The following examples illustrate different methods of preparing sorbent materials and experiments performed to test the efficiency of the sorbent materials to adsorb and to react with mercury:

EXAMPLE 1

Synthesized mordenite was crushed to a particle size smaller than 45 micrometers and leached for four hours at 90° C. in a 1 N (normality) solution of HCl, having 30 grams of zeolite per liter of the solution. After leaching, the zeolite was washed until the wash solution was free of chloride, as tested by silver nitrate. The acid-leached and washed zeolite was dried at 110° C. The thus-prepared hydrogen mordenite was placed over a small mercury sample, and the hydrogen mordenite and the mercury sample were soaked at 200° C. for twenty-four hours. Upon removal, the mordenite had turned brown. When heated to 405° C., the mercury-bearing mordenite expelled a vapor from which mercury was condensed. The mercury condensate was 22% by weight of the mercury-bearing mordenite before distillation. The purged hydrogen mordenite was recovered and reused for a second adsorption cycle.

EXAMPLE 2

Synthesized mordenite was crushed to pass a 100 mesh screen. The crushed mordenite was leached in a solution of 2.23% concentrated nitric acid in water, with 25 grams of mordenite per liter. The acid leach was at 80 to 90° C. for four hours, followed by washing and drying. The mordenite and a mercury sample were soaked at 184° C. for six hours. The product was red-brown mercury-bearing mordenite.

EXAMPLE 3

The procedure of example 2 was repeated using 2.07% concentrated sulfuric acid in water for the acid leach. The product was red-brown mercury-bearing mordenite.

EXAMPLE 4

An amount of commercial mordenite powder was placed over a mercury sample, and both the mercury and the mordenite powder were soaked at 180° C. for eight hours. There was no color change or reaction of mordenite.

EXAMPLE 5

An amount of commercial mordenite powder was leached in 1 N solution of HCl at 90° C. for four hours, washed, and dried. The acid-leached, white mordenite was placed over mercury and soaked at 185° C. for six hours. The product was yellow, indicating adsorption and reaction of mercury.

EXAMPLE 6

Synthesized mordenite, leached in 1 N acid, washed, and dried, was exposed to $9 \times 10^{-5}$ atmospheres of mercury vapor in air with the sorbent at 100° C. After five days, analysis of mordenite gave 3.2% mercury.

EXAMPLE 7

Synthesized mordenite, leached in 1 N acid, washed, and dried, was exposed to $2.6 \times 10^{-5}$ atmospheres of mercury vapor in air with the sorbent at 70° C. After six days of exposure to mercury vapor, analysis of mordenite gave 0.94% mercury.

Examples 6 and 7 show that hydrogen mordenite also reacts with mercury vapor in air that is unsaturated in mercury.

EXAMPLE 8

Synthesized mordenite, leached in 1 N acid, washed, and dried, was exposed to $1.7 \times 10^{-6}$ atmospheres of mercury vapor in water-saturated air at 21° C. After ninety days of exposure to mercury vapor, analysis of mordenite gave 0.2% mercury and 13% water. Thus, this experiment shows that mordenite is effective even at room temperature and in the presence of water vapor.

EXAMPLE 9

A piece of commercial mordenite, which had been ion-exchanged with ammonium ions and then calcined, was treated as in example 5. Without acid leaching, this mordenite failed to adsorb mercury as shown by the absence of a change in color. After acid leaching, as in example 5, the product adsorbed and reacted with mercury at 185° C. over six hours, yielding a yellow product.

EXAMPLE 10

Natural mordenite from Rome, Oreg., was leached in a 1 N solution of HCl at 90° C. for four hours, washed, and dried. The acid-leached product was exposed to mercury vapor, at 184° C. for six hours, and became red-brown from adsorption and reaction with mercury.

EXAMPLE 11

Clinoptilolite from Castle Creek, Id., was treated as in example 5. After exposure to mercury vapors at 184° C. for six hours, the clinoptilolite was yellow, indicating adsorption and reaction with mercury.

EXAMPLE 12

Acid-washed mordenite pellets were impregnated with a copper nitrate solution, dried, and calcined at 500° C. This product, containing 2.8% copper, was exposed to mercury vapor of $1.7 \times 10^{-3}$ atm at 130° C. After three days, an analysis of the product gave 26.1% mercury. Under microscopic examination of the pellets, before and after crushing to a powder, no beads of mercury were found. Increased birefringence of the product, and a color change, show that mercury reacted with the host. Thus, after acid leaching, a zeolite host can be metal-loaded for use as a catalyst and remain an adsorbent and a reactant for mercury.

While the invention has been herein described by way of examples in connection with what are at present considered to be the preferred embodiments, it is to be understood that the invention is not limited to the disclosed embodiments, but is intended to cover various combinations and/or modifications of its features and other applications within the scope of the invention as defined in the appended claims.

I claim:

1. A method of removing mercury from mercury-containing exhaust gases emanating from an industrial process or a combustion process, said method comprising:

contacting the mercury in the exhaust gases with a sorbent material at a location where the temperature of the exhaust gases is higher than room temperature, wherein the sorbent material is hydrogen mordenite or hydrogen clinoptilolite, for adsorbing mercury and causing the mercury to react with the sorbent material to produce mercury-laden sorbent material.

2. A method according to claim 1, wherein the sorbent material is hydrogen mordenite.

3. A method according to claim 2, further comprising a step of heating the mercury-laden sorbent material to a temperature of at least about 400° C. so as to remove mercury from the mercury-laden sorbent material and to regenerate the sorbent material.

4. A method according to claim 3, further comprising a step of reusing of the sorbent material for mercury removal.

5. A method according to claim 3, further comprising a step of condensing mercury removed from the mercury-laden sorbent material.

6. A method according to claim 1, wherein the sorbent material is prepared by acid leaching mordenite or clinoptilolite.

7. A method according to claim 1, wherein the sorbent material is hydrogen clinoptilolite.

8. A method according to claim 7, further comprising a step of selecting a clinoptilolite stock, which can be ion exchanged and acid leached without degradation of the crystal structure.

9. A method according to claim 7, further comprising a step of disposing of the produced mercury-laden sorbent material.

10. A method according to claim 1, wherein the sorbent material is copper-impregnated hydrogen mordenite.

11. A method according to claim 1, wherein said step of contacting the mercury in the exhaust gases with the sorbent material occurs at a temperature higher than about 100° C.

12. A method according to claim 1, wherein said step of contacting the mercury in the exhaust gases with the sorbent material occurs at a temperature higher than about 180° C.

13. A method according to claim 1, further comprising a step of forming a particulate, fixed bed including the sorbent material, wherein said step of contacting of the mercury in the exhaust gases with the sorbent material is performed by conducting the exhaust gases through the fixed bed.

14. A method according to claim 13, further comprising a step of regenerating the sorbent material of the particulate bed by heating a portion of the sorbent material to a temperature of at least about 400° C.

15. A method according to claim 14, wherein said step of regenerating is performed by removing a portion of the sorbent material from the bed.

16. A method according to claim 1, wherein said step of contacting of the mercury in the exhaust gases with the sorbent material is performed by conducting the exhaust gases through a honeycomb element system comprising the sorbent material as an effective constituent.

17. A method according to claim 16, further comprising a step of regenerating the effective constituent of the honeycomb element system by heating the element system to a temperature of at least about 400° C.

18. A method according to claim 1, wherein said step of contacting of the mercury in the exhaust gases with the sorbent material is performed by providing an exhaust gas train that includes two parallel honeycomb element units for receiving the exhaust gases, each of the honeycomb element units comprising the sorbent material as an effective constituent and being heated to a temperature of at least about 400° C.

19. A method according to claim 18, further comprising a step of regenerating one of the parallel honeycomb element units while simultaneously conducting the exhaust gases through the other unit.

\* \* \* \* \*